United States Patent
Zach

(10) Patent No.: US 10,683,833 B2
(45) Date of Patent: Jun. 16, 2020

(54) AIR CONDUCTION SYSTEM OF AN INTERNAL COMBUSTION ENGINE

(71) Applicant: Bayerische Motoren Werke Aktiengesellschaft, Munich (DE)

(72) Inventor: Heinz Zach, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/051,546

(22) Filed: Aug. 1, 2018

(65) Prior Publication Data

US 2018/0340495 A1 Nov. 29, 2018

Related U.S. Application Data

(63) Continuation of application No. PCT/EP2017/051704, filed on Jan. 27, 2017.

(30) Foreign Application Priority Data

Feb. 2, 2016 (DE) .................. 10 2016 201 518

(51) Int. Cl.
*F02M 35/02* (2006.01)
*F02M 35/10* (2006.01)

(52) U.S. Cl.
CPC .. *F02M 35/0209* (2013.01); *F02M 35/10013* (2013.01); *F02M 35/10255* (2013.01);
(Continued)

(58) Field of Classification Search
CPC ......... F02M 35/0209; F02M 35/10013; F02M 35/10255; F02M 35/10262;
(Continued)

(56) References Cited

U.S. PATENT DOCUMENTS 4,496,019 A * 1/1985 Tanaka .................. B62K 5/027
  180/215
6,009,898 A * 1/2000 Risch ............... F02M 35/10255
  123/198 E (Continued)

FOREIGN PATENT DOCUMENTS

CN   202768192 U   3/2013
CN   104534156 A   4/2015

(Continued)

OTHER PUBLICATIONS

International Search Report (PCT/ISA/210) issued in PCT Application No. PCT/EP2017/051704 dated Apr. 5, 2017 with English translation (six (6) pages).

(Continued)

*Primary Examiner* — Hung Q Nguyen
(74) *Attorney, Agent, or Firm* — Crowell & Moring LLP

(57) ABSTRACT

An air conduction system includes an air collecting chamber, a first air inlet, an additional air inlet, and a buoyancy body. Air is supplyable to the air collecting chamber by said air inlets. The first air inlet has an air control valve via which the air inlet is selectively closed. The additional air inlet has an additional air control valve via which the additional air inlet is selectively closed. A buoyancy body is provided which is movable via a geodetically rising water level and which is operatively connected to a closure element of the air control valve of the first air inlet. The closure element is convertible from an open state, in which the first air inlet is fluidically connected to the air collecting chamber, into a closed state, in which said fluidic connection is interrupted, when the water level rises. The closure element comprises the buoyancy body.

9 Claims, 2 Drawing Sheets

(52) U.S. Cl.
CPC . *F02M 35/10262* (2013.01); *F02M 35/10301* (2013.01); *Y02T 10/146* (2013.01)

(58) Field of Classification Search
CPC ........... F02M 35/10301; F02M 35/161; F02M 35/168; Y02T 10/146
USPC .................................................... 123/184.21
See application file for complete search history.

(56) References Cited

U.S. PATENT DOCUMENTS

| | | | |
|---|---|---|---|
| 2002/0078916 A1 | 6/2002 | Altmann et al. | |
| 2007/0235000 A1 | 10/2007 | Jacobi-Hinderer | |
| 2010/0050578 A1* | 3/2010 | Khouw | B01D 45/02 55/290 |

FOREIGN PATENT DOCUMENTS

| | | | | |
|---|---|---|---|---|
| CN | 204691947 U | 10/2015 | | |
| DE | 195 38 605 A1 | 4/1997 | | |
| DE | 195 45 978 A1 | 6/1997 | | |
| DE | 195 45 979 A1 | 6/1997 | | |
| DE | 196 13 860 A1 | 10/1997 | | |
| DE | 197 10 056 A1 | 9/1998 | | |
| DE | 197 30 188 A1 | 1/1999 | | |
| DE | 100 53 145 A1 | 5/2002 | | |
| FR | 2929341 A1 * | 10/2009 | ....... | F02M 35/10013 |
| GB | 816 388 A | 7/1959 | | |
| JP | 58187575 A * | 11/1983 | ....... | F02M 35/10013 |
| JP | 2005-155439 A | 6/2005 | | |
| JP | 2015-68200 A | 4/2015 | | |

OTHER PUBLICATIONS

German-language Written Opinion (PCT/ISA/237) issued in PCT Application No. PCT/EP2017/051704 dated Apr. 5, 2017 (five (5) pages).

German-language Search Report issued in counterpart German Application No. 10 2016 201 518.4 dated Feb. 13, 2017 with Partial English translation (nine (9) pages).

German-language Search Report issued in counterpart German Application No. 10 2016 201 518.4 dated Sep. 26, 2016 with Partial English translation (nine (9) pages).

Chinese-language Office Action issued in counterpart Chinese Application No. 201780004109.4 dated Nov. 1, 2019 with English translation (17 pages).

* cited by examiner

AIR CONDUCTION SYSTEM OF AN INTERNAL COMBUSTION ENGINE

CROSS REFERENCE TO RELATED APPLICATIONS

This application is a continuation of PCT International Application No. PCT/EP2017/051704, filed Jan. 27, 2017, which claims priority under 35 U.S.C. § 119 from German Patent Application No. 10 2016 201 518.4, filed Feb. 2, 2016, the entire disclosures of which are herein expressly incorporated by reference.

BACKGROUND AND SUMMARY OF THE INVENTION

The embodiments of the invention relate to an air conduction system for supplying air to an internal combustion engine.

Internal combustion engines in motor vehicles are designed to oxidize fuel with the addition of air and to convert the energy released into mechanical work (rotary speed, torque). The air supplied to the internal combustion engine must meet certain requirements of quality and quantity. A problem in existing air conduction systems, especially when the motor vehicle is traveling through water, is that water gets into the internal combustion engine and thus too little air, or air contaminated with water, gets into the internal combustion engine. If the fraction of water in the supplied air rises above a certain threshold value, the internal combustion engine will be damaged; such damage is known as a water hammer.

An example of an air conduction system is disclosed in DE 196 13 860 A1, and has a first and a second port for suctioning of air for the internal combustion engine. Furthermore, this system has a slide valve arranged in a pipe, which can be moved by water getting into this pipe. A displacement of the slide valve makes it possible to move a closure device, by which the first port can be closed and the second port can be opened up, so that the air intake path can be controlled in dependence on the water level in the pipe.

One problem which the embodiments of the present invention proposes to solve is to provide an air conduction system with an improved operating security. This problem is solved by the inventive air conduction system.

As used herein, an air conduction system for supplying air to an internal combustion engine for a motor vehicle means a device for supplying air from the surroundings of the vehicle to a combustion chamber of the internal combustion engine.

As used herein, a first air inlet means a recess through which air can flow as planned into the air conduction system. Moreover, the air conduction system has an additional air inlet, likewise designed as a recess, through which air can likewise flow into the air conduction system. Moreover, the air inlets can be closed selectively. The additional air inlet is disposed geometrically at a distance from the first air inlet. The additional air inlet may be situated above the first air inlet in the regular operation of the air conduction system.

The additional air inlet may be arranged at a greater geodetic height relative to the first air inlet, a surface center of gravity of a cross sectional area of the additional air inlet through which air flows into the air conduction system through it may be situated at a greater height in relation to a surface center of gravity of such a cross sectional area of the first air inlet and the lowermost point of the additional air inlet may be situated at a greater height in relation to the uppermost point of the first air inlet. In particular, thanks to such an arrangement of the two air inlets, it may be ensured that, under rising water level, for example when driving on a road which is under water, the first air inlet is closed, especially as soon as water would get in through it into the air conduction system, and then the additional air inlet is opened, through which no water can then get in on account of its disposition.

As used herein, an air collecting chamber means a space which can be supplied with air from both the first air inlet and the additional air inlet. In particular, the air collecting chamber is meant to be an air filter cartridge or part of an air filter cartridge. The air collecting chamber can be understood to be a pipe segment which can be connected to an air filter cartridge. In particular, an air filter for cleaning the air or a portion of the air which is supplied to the internal combustion engine is disposed in the air collecting chamber. The air filter can be partly or entirely bypassed by the air flowing through the additional air inlet.

The closing of the first air inlet can be accomplished by an air control valve, which is designed in particular for the selective closing of the first air inlet. The closing of the additional air inlet can be accomplished by means of an additional air control valve, which is designed in particular for the selective closing of the additional air inlet. By an appropriate actuating of these air control valves, the air inlet and the additional air inlet may be opened and closed in dependence on each other, or opened and closed independently of each other.

Moreover, the air conduction system comprises a buoyancy body. As used herein, a buoyancy body means a body, especially a hollow body, which is designed to float in water. As used herein, a hollow body means a hollow body which is at least partly or entirely filled with a gas or a porous material. Moreover, the air control valve has a closure element for opening and closing the first air inlet, the buoyancy body being at least operatively connected to the closure element, rigidly connected to it, and arranged on it or in it.

As used herein, the closure element means a device or a component for the closing of the air inlet. The air control valve has a sealing surface, which can be contacted by the closure element. The closure element may be designed as a movable, a pivoting flap of the air control valve. The buoyancy body can be connected to the closure element in such a way that it can be converted under rising water level from an opened state, in which the first air inlet is fluidically connected to the air collecting chamber, to a closed state in which this fluidic connection is interrupted.

In particular, this closure element comprises the buoyancy body and insofar as the buoyancy body experiences a buoyancy during rising geodetic water level, the closure element is converted from its opened to the closed state and thereby the first air inlet is closed, so that a penetrating of water into the air conduction system is at least reduced.

In one preferred embodiment, the closure element is designed as a rotatably mounted closure flap arranged in the air control valve and it has a cavity, so that a buoyancy body is formed. The cavity may be entirely or partly filled with air and this cavity may be entirely or partly filled with a porous material. In particular when the buoyancy body is arranged as a hollow body in the closure element formed as a flap and thus integrally connected to it, an especially simple design of the air conduction system is made possible.

The additional air control valve may comprise an additional closure element, with which the additional air inlet can be selectively closed. The additional closure element can move from an opened position, in which a fluidic connection between the additional air inlet and the air collecting chamber, and a closed position, in which this connection does not exist. The additional closure element is designed as an additional closure flap mounted movably, rotatably or lengthwise displaceably with respect to the additional air control valve. The additional closure element may be mounted such that it may be shifted in translation by a lever gearing with respect to the additional air control valve. In particular, such an additional closure element makes possible an especially simple control system, both for the first air inlet and for the additional air inlet.

The additional air control valve may have a sealing surface section which can be contacted by the additional closure element in its closed position. The additional closure element, the region of the additional closure element which may be designed for contacting this sealing surface section, may be disposed downstream from the additional air inlet to the air collecting chamber behind this sealing surface section. The additional closure element may be arranged entirely or partly downstream from this sealing surface section. In particular, such an arrangement of the additional closure element can make it possible for a partial vacuum $p_1$ in the air collecting chamber to force the additional closure element into its opened position once this pressure is less than the air pressure $p_2$ bearing from the outside against the additional closure element, i.e., generally the ambient air pressure. The application of this force enables an at least partial, or a total independent control of the additional closure element. In the event that the first air inlet is closed by the air control valve, the air pressure $p_1$ in the air collecting chamber will drop to a threshold value at which the additional air control valve opens up the additional air inlet and thus produces a fluidic connection between the additional air inlet and the air collecting chamber. In particular, in the above described instance, the additional closure element is thus opened against a spring tension of a spring device and against the air pressure $p_1$ in the air collecting chamber. The spring device may be arranged such that the additional closure element is forced by this spring device into its closed position. The opening and closing characteristic of the additional closure element may be adjusted via a spring characteristic of this spring device.

It is furthermore advantageous with such an automatic control system of the additional air control valve that in the event of an unplanned closure of the first air inlet, thus especially without participation of the air control valve, the operation of the internal combustion engine continues to be possible, since in this case the additional air control valve can open. In certain instances, under especially heavy intrusion of snow or other contaminants into the area of the motor vehicle where the first air inlet is situated, there may occur said unplanned closure of the first air inlet. If the first air inlet closes, without the second air inlet being opened, the internal combustion engine is no longer supplied with air and it will shut off. The operation of the internal combustion engine is only made possible once more if the snow frees up the first air inlet once more, in particular mechanically or by melting. This problem can be avoided in particular by the vacuum-controlled opening of the additional air inlet.

The closure element of the first air control valve may be operatively connected to the additional closure element of the additional air control valve, alternatively these may be mechanically coupled together. This coupling may be designed such that a movement of the closure element from the opened to the closed position produces a movement of the additional closure element from the closed to the opened position, i.e., a diametrically opposite movement, and vice versa. In particular, a mechanical coupling of the additional closure element to the closure element enables an especially secure operative connection of these.

Such an operative connection between the additional closure element and the closure element of the first air inlet valve, thus especially by means of a Bowden cable, also makes it possible to transmit an activating force from the additional closure element to the closure element of the first air control valve and thereby heighten the certainty of activation, among other things. Especially in the event that a partial vacuum prevails in the air collecting chamber and an activating force is exerted on the additional closure element, this can be transmitted to the closure element of the first air inlet valve, so that the force with which it can be moved into its closed position is increased.

A control cable connection or a Bowden cable connection may be provided for the operative connection between the additional closure element and the closure element. In particular, Bowden cables are an option often employed in plant engineering for the remote transmission of movements and thus an especially safe operation of the air conduction system is made possible by means of them.

The additional closure element can be subjected by means of a spring device to a spring force, especially a closing force. The additional closure element can be subjected by means of this spring device to the spring force such that the additional closure element at least for as long as it is in the closed position is forced into this position by the spring force. In particular, such a spring device makes it possible to set the threshold value for the partial vacuum in the air collecting chamber at which the additional air control valve opens the additional air inlet.

The first air inlet may open downward. If water rises up to this downwardly opened air inlet, the internal combustion engine can no longer take in any air through this first air inlet and a partial vacuum is created in the air collecting chamber. In the event of a partially or fully automatically opening additional air inlet, this additional air inlet may be opened by virtue of the above explained pressure/vacuum relations. In particular, in such a case, the operation of the internal combustion engine would then become possible even if an air control valve situated at the first air inlet is not working properly, and thus an especially secure redundant system can be achieved.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
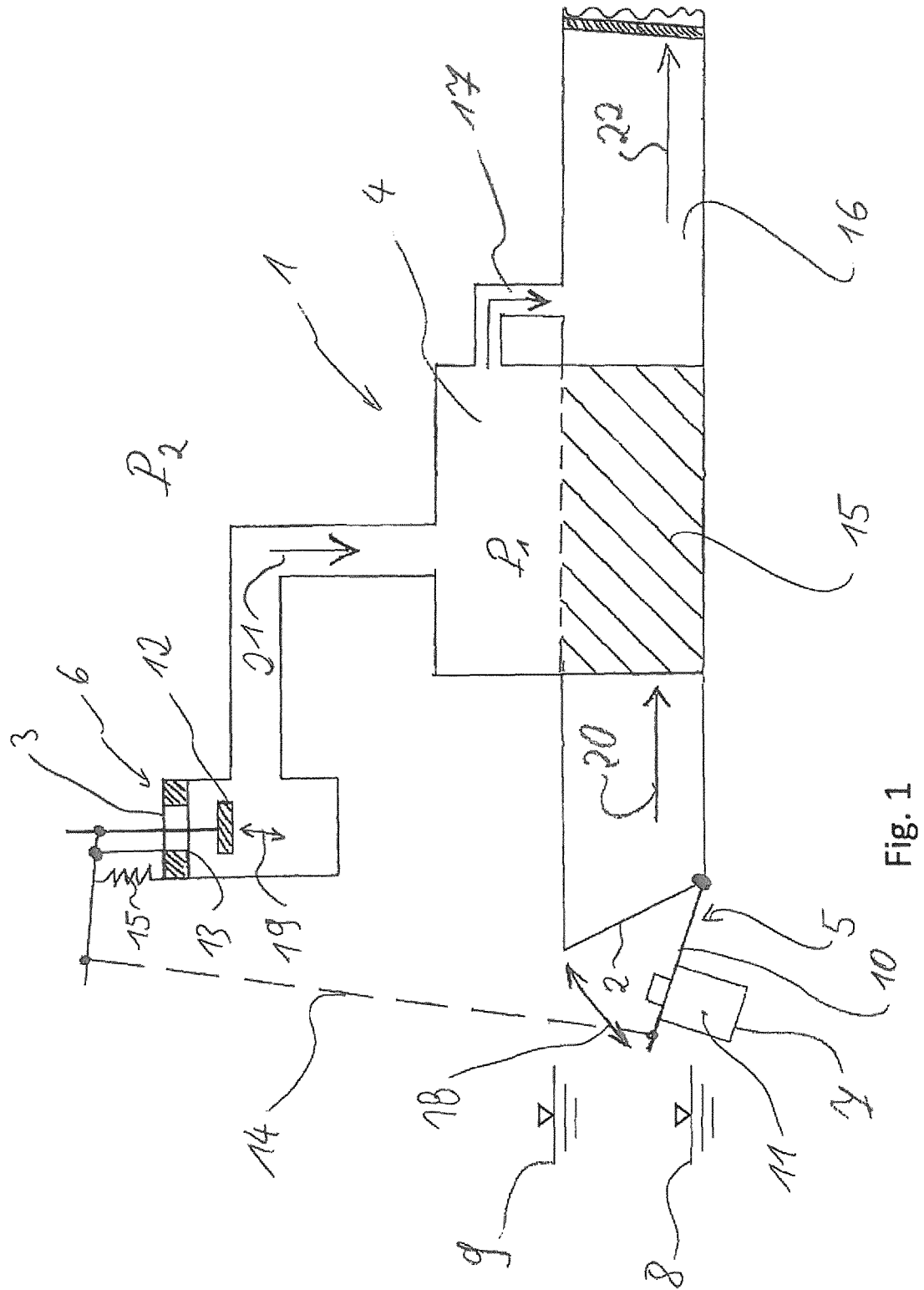
FIG. 1 shows a longitudinal section representation of the inventive air conduction system.

FIG. 1 shows a longitudinal section representation of the inventive air conduction system. On account of the schematically represented first water level 8, the closure flap 10 is in a partly closed position. If the water level rises to the second schematically represented water level 9, the closure flap 10 moves into its closed position. The closure flap 10 is arranged at the first air control valve 5, able to rotate in the direction 18.

Moreover, the closure flap 10 has a float body 11, which provides the buoyancy by which the closure flap 10 is brought into the closed position, under rising water level from water level 8 to water level 9. In the closed state of the closure flap 10, the first air inlet 2 is closed and no air flow 20 can get from the first air inlet 2 in the direction of the air filter 15, which is situated between the first air inlet and the internal combustion engine (not shown). The closure flap 10 is connected by means of the Bowden cable 14 to the additional air control valve 6. The additional air inlet 3 can be selectively closed by means of the additional air control valve 6.

For the selective closing of the additional air inlet 3, this additional air control element 6 has an additional closure element 12, which can be moved in translation in direction 19 by the Bowden cable 14. The Bowden cable can be actuated by means of the closure flap 10, which can move in direction 2. By means of the tension spring 15, the additional closure element 12 is held in its closed position and contacts the sealing area 13 of the additional air control valve 6.

If the closure flap 10 is closed and the internal combustion engine (not shown) continues to operate, i.e., creates a suction air flow 22, the air pressure $p_1$ will arise in the air collecting chamber 4, which is generally less than the air pressure $p_2$ of the air surrounding the conduction device 1. This air pressure difference produces the self-reinforcing action that the additional closure element 12 by virtue of the pressure applied is pulled into its opened position against the tension spring force of the tension spring 15 and the closure flap 10 into its closed position. The air flowing through the additional air inlet 3 creates the air flow 21 in the direction of the internal combustion engine (not shown), which may optionally flow through a bypass air duct 17 around the air filter 15.

Figure 2:
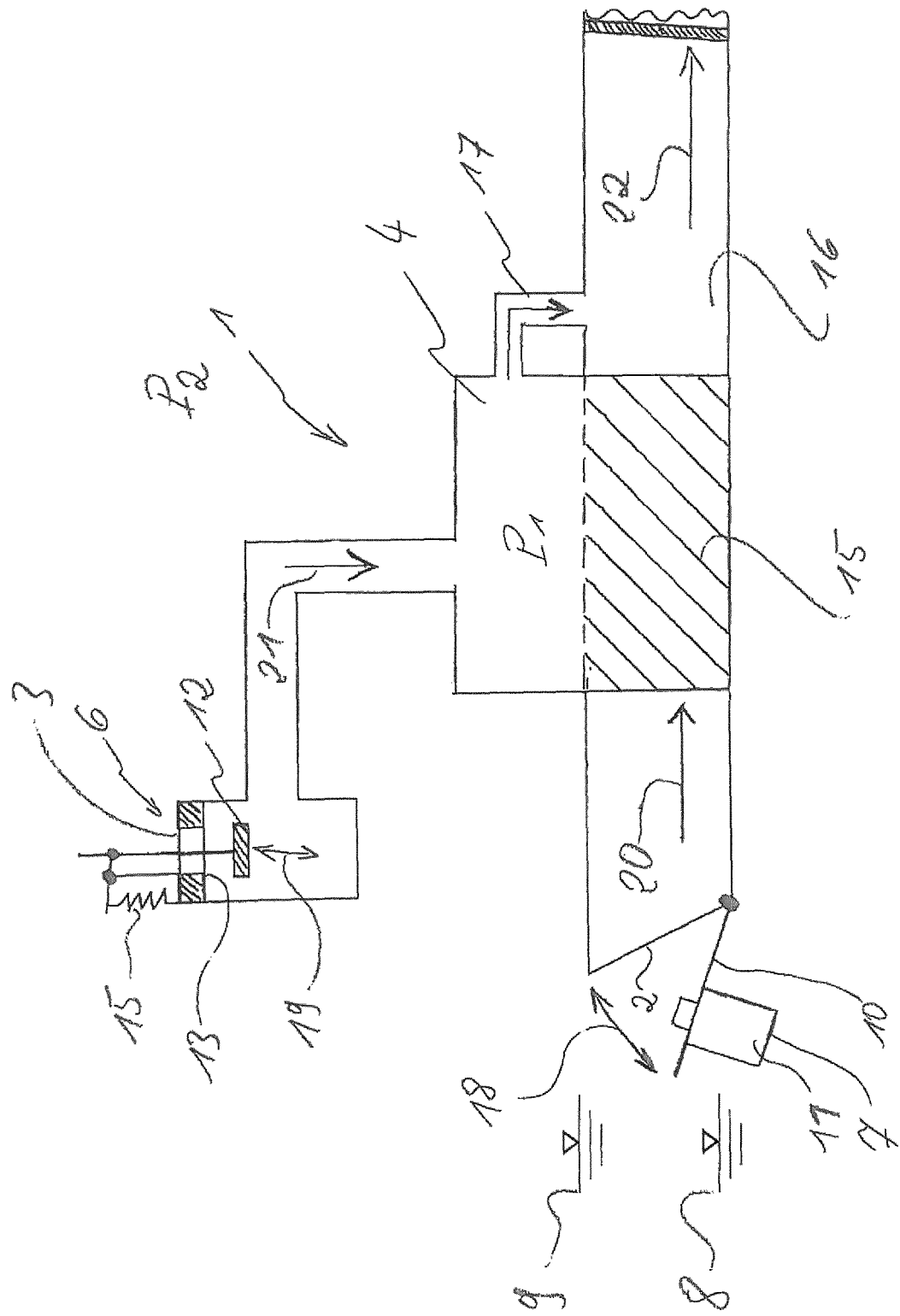
FIG. 2 shows a longitudinal section representation of the inventive air conduction system.

FIG. 2 shows a longitudinal section representation of the inventive air conduction system. At least the basic differences from the embodiment represented in FIG. 1 shall now be discussed. In FIG. 2, no forced coupling by a Bowden cable 14 is provided between the additional closure element 12 and the closure flap 10. The additional closure element 12 of the additional air control valve 6 is controlled merely by pressure ($p_1$, $p_2$), as well as by the spring force which can be applied by the tension spring 15 to the additional closure element 12.

In particular, such a pressure-controlled device makes it possible to continue the operation of the internal combustion engine (not shown) despite an unplanned closure of the first air inlet 2, for example by snow and especially also by water, since in this case the additional air control valve 6 automatically opens up the additional air inlet 3.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air conduction system for supplying air to an internal combustion engine for a motor vehicle, comprising:
   an air collecting chamber;
   a first air inlet;
   an additional air inlet; and
   a buoyancy body, wherein
   air is supplyable to the air collecting chamber by said air inlets,
   the first air inlet has an air control valve via which the air inlet is selectively closed,
   the additional air inlet has an additional air control valve via which the additional air inlet is selectively closed,
   the buoyancy body is provided which is movable via a geodetically rising water level and which is operatively connected to a closure element of the air control valve of the first air inlet,
   the closure element is convertible from an open state, in which the first air inlet is fluidically connected to the air collecting chamber, into a closed state, in which said fluidic connection is interrupted, when the water level rises,
   the closure element comprises the buoyancy body, and
   the closure element is formed as a flat closure flap and the buoyancy body is disposed on one side of the flat closure flap.

2. The ventilation system as claimed in claim 1, wherein the closure element has a cavity that defines the buoyancy body.

3. The ventilation system as claimed in claim 1, wherein the additional air control valve comprises an additional closure element, which is movable from an opened position, in which a fluidic connection exists between the additional air inlet and the air collecting chamber, to a closed position, in which this fluidic position is interrupted.

4. The air conduction system as claimed in claim 3, wherein the additional closure element is mounted lengthwise displaceably on the additional air control valve.

5. The ventilation system as claimed in claim 4, wherein the additional air control valve has a sealing surface section which is contactable by the additional closure element in its closed position,
   the additional closure element is arranged at least partly, in the downstream direction from the additional air inlet to the air collecting chamber, after the sealing surface section, so that a partial vacuum prevailing in the air collecting chamber results in a forcing of the additional closure element into its opened position and the closure element into its closed position.

6. The ventilation system as claimed in claim 5, wherein the additional closure element is operatively connected to the closure element, so that a movement of the closure element into the closed position brings about a movement of the additional closure element to the opened position and vice versa.

7. The ventilation system as claimed in claim 6, wherein a Bowden cable is provided for the operative connection of the closure element to the additional closure element.

8. The ventilation system as claimed in claim 6, wherein the additional closure element is subjected to a spring force via a spring device, and the spring force forces the additional closure element into the closed position.

9. The ventilation system as claimed in claim 1, wherein the closure element is pivoted on the first air inlet.

* * * * *